United States Patent
Watanabe et al.

(10) Patent No.: US 6,414,101 B1
(45) Date of Patent: Jul. 2, 2002

(54) DENDRITIC POLYMERS AND MAKING METHOD

(75) Inventors: Osamu Watanabe; Takanobu Takeda; Jun Hatakeyama; Tomohiro Kobayashi; Toshinobu Ishihara; Jun Watanabe, all of Nakakubiki-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/535,166

(22) Filed: Mar. 24, 2000

(30) Foreign Application Priority Data

Mar. 26, 1999 (JP) .......................... 11-082884

(51) Int. Cl.$^7$ .................. C08F 212/14; C08F 257/00
(52) U.S. Cl. .................. 526/313; 526/87; 526/173; 526/293; 526/326; 526/332; 526/333; 525/242; 525/292; 525/308; 525/312
(58) Field of Search .................. 525/242, 292, 525/308, 312; 526/313, 173, 87, 293, 326, 332, 333

(56) References Cited

U.S. PATENT DOCUMENTS

| | | | |
|---|---|---|---|
| 4,491,628 A | | 1/1985 | Ito et al. |
| 4,603,101 A | | 7/1986 | Crivello |
| 5,239,015 A | | 8/1993 | Sheehan et al. |
| 5,252,435 A | | 10/1993 | Tani et al. |
| 5,587,441 A | * | 12/1996 | Frechet et al. .......... 526/238 |
| 5,591,809 A | * | 1/1997 | Vicari et al. .......... 528/298 X |
| 5,625,007 A | | 4/1997 | Sheehan et al. |
| 6,252,025 B1 | * | 6/2001 | Wang et al. .......... 526/313 X |

FOREIGN PATENT DOCUMENTS

| | | |
|---|---|---|
| EP | 0 007 791 | 2/1980 |
| EP | 0 464 408 | 1/1992 |
| EP | 0 496 405 | 7/1992 |
| EP | 0 788 031 | 8/1997 |
| EP | 0 942 329 | 9/1999 |
| JP | 57-44608 | 3/1982 |
| JP | 62-115440 | 5/1987 |
| JP | 63-27829 | 2/1988 |
| JP | 63-36602 | 7/1988 |
| JP | 2-27660 | 6/1990 |
| JP | 3-223858 | 10/1991 |
| JP | 4-211258 | 8/1992 |
| JP | 4-279608 | 10/1992 |

OTHER PUBLICATIONS

Patent Abstracts of Japan vol. 18, No. 674; Dec. 19, 1994; & JP 06 266105 ; Sep. 1994.
English abstract for JP–63–27829.
English abstract for JP–4–211258.
English abstract for JP–57–44608.
English abstract for JP–63–36602.

* cited by examiner

*Primary Examiner*—Fred Teskin
(74) *Attorney, Agent, or Firm*—Millen, White, Zelano & Branigan, P.C.

(57) ABSTRACT

A dendritic or hyperbranched polymer having a weight average molecular weight of 500–10,000,000 is prepared by polymerizing a hydroxystyrene derivative, adding a branching monomer midway in the polymerization step to introduce branch chains, and repeating the polymerizing and branching steps. The polymer is advantageously used as the base resin of resist material because the size of the polymer can be reduced while maintaining strength.

20 Claims, No Drawings

DENDRITIC POLYMERS AND MAKING METHOD

This invention relates to novel dendritic or hyperbranched polymers of phenol derivatives and a method for preparing the same. More particularly, it relates to novel dendritic or hyperbranched polymers of polyhydroxystyrene derivatives and a method for preparing the same. The novel dendritic or hyperbranched polymers are useful as a base resin for resist material in forming ultrafine patterns during the microfabrication of VLSI.

BACKGROUND OF THE INVENTION

While a number of recent efforts that are being made to achieve a finer pattern rule in the drive for higher integration and operating speeds in LSI devices, lithography is thought to hold particular promise as the next generation in microfabrication technology. Deep-UV, EB and x-ray lithography is capable of achieving a minimum feature size of 0.2 μm or less.

Recently developed acid-catalyzed chemically amplified positive resists, such as those described in JP-B 2-27660, JP-A 63-27829, U.S. Pat. No. 4,491,628 and U.S. Pat. No. 5,310,619, utilize a high-intensity KrF excimer laser as the deep-UV light source. These resists are especially promising for deep-UV lithography due to their excellent properties including sensitivity, resolution, and dry etching resistance.

For example, JP-A 62-115440 discloses a resist material comprising poly-4-tert-butoxystyrene and a photoacid generator. Similarly, JP-A 3-223858 discloses a two-component resist material comprising a resin bearing tert-butoxy groups within the molecule, in combination with a photoacid generator. JP-A 4-211258 discloses a two-component resist material which is comprised of polyhydroxystyrene bearing methyl, isopropyl, tert-butyl, tetrahydropyranyl, and trimethylsilyl groups, together with a photoacid generator.

In the state-of-the-art, the base polymers which have been developed for resists are synthesized by conventional techniques, typically addition polymerization such as radical polymerization, anion polymerization and cation polymerization as described in JP-A 4-279608, JP-A 57-44608, and JP-B 63-36602. The polymers synthesized by such conventional techniques basically have linear structures.

These linear polymer resins for resist material, however, suffer from several problems. If they are required to be processed to such a finer pattern that the size of polymer molecules may become approximate to the size of fine lines, then a desired pattern of fine lines cannot be formed. Their heat resistance, sensitivity and resolution are unsatisfactory. A further improvement is thus needed.

An object of the invention is to provide a novel and improved dendritic or hyperbranched polymer which can be used as the base resin to formulate a resist composition which is superior to prior-art resists in sensitivity, resolution, exposure latitude, process flexibility and reproducibility, and which forms a resist pattern having excellent plasma etching resistance and outstanding thermal stability. Another object of the invention is to provide a method for preparing the dendritic or hyperbranched polymer.

SUMMARY OF THE INVENTION

We have found a novel dendritic or hyperbranched polymer of a phenol derivative that can be produced by the method to be described later. A resist composition formulated using this dendritic or hyperbranched polymer as the base resin is superior in resolution, exposure latitude, process flexibility, and practical utility and is advantageously used for precise microfabrication. Namely, the dendritic or hyperbranched polymer is quite useful as the base resin in resist material for VLSI microfabrication.

In a first aspect, the invention provides a polymer in the form of a dendritic or hyperbranched polymer of a phenol derivative having a weight average molecular weight of 500 to 10,000,000.

In one preferred embodiment, the polymer includes recurring units (I) and/or recurring units (II) and recurring units (III) as shown below. The number of units (III) is 1 to 1,000.

units (I):

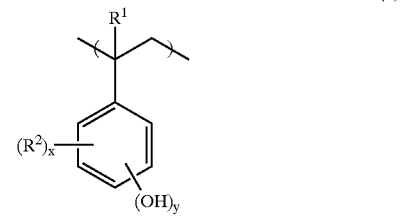

(1)

units (II):

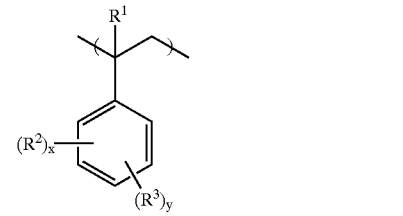

(2)

Herein $R^1$ is hydrogen or methyl, $R^2$ is independently a straight, branched or cyclic alkyl group of 1 to 30 carbon atoms or aryl group of 6 to 30 carbon atoms, $R^3$ is a hydroxyl or $OR^4$ group, $R^4$ is an acid labile group or acid stable group, x is 0 or a positive integer, y is a positive integer, and the sum of x and y is up to 5.

units (III):

(3)

Herein $R^1$ is as defined above, and $R^5$ is a straight, branched or cyclic alkylene group of 1 to 30 carbon atoms or arylene group of 6 to 30 carbon atoms, or a mixture thereof, which may contain an ether or ester bond.

The units (III) are preferably of the following formula (3a):

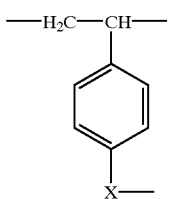
(3a)

wherein X is a valence bond or a straight or branched alkylene group of 1 to 10 carbon atoms which may contain a hydroxyl or carbonyl group.

In a more preferred embodiment, the dendritic or hyperbranched polymer comprises recurring units of at least one of the following formulae (4) to (8):

(4)

(5)

(6)

(7)

(8)

wherein broken lines represent polymer chains of the recurring units (I) and/or (II), and A represents the units (III)

In a second aspect, the invention provides a method for preparing the dendritic polymer defined above, comprising the steps of polymerizing a hydroxystyrene derivative monomer into an intermediate and finally into a polymer, adding a branching monomer midway in the polymerization step to introduce branch chains into the intermediate, and repeating the polymerizing and branching steps until the desired polymer is obtained.

In one preferred embodiment of the method, the hydroxystyrene derivative monomer is represented by at least one of the following general formula (i) and (ii), and the branching monomer is presented by the following formula (iii).

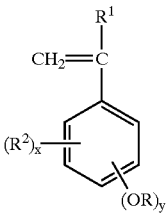
(i)

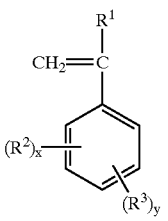
(ii)

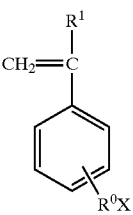
(iii)

Herein $R^1$, $R^2$, $R^3$, x, and y are as defined in claim 2, R is a protective group for a hydroxyl group, $R^0$ is a valence bond or an alkylene group of 1 to 20 carbon atoms, and X is a halogen atom, aldehyde group or alkoxycarbonyl group.

Preferably, the polymerization step entails living polymerization, typically living anion polymerization.

The novel polymers or macromolecules of the invention are dendritic or hyperbranched polymers of phenol derivatives. When these polymers are used as the base resin, the resulting resist compositions are improved in performance due to the increased branches and increased free volume of the polymers, as compared with the prior art linear structure base resins. For example, the dendritic or hyperbranched polymers have a smaller molecular size than corresponding linear polymers, which leads to an improved resolution. When it is desired to improve heat resistance by increasing the molecular weight of the polymer, this can be accomplished without increasing the viscosity considerably, which leads to an improved process stability. The dendritic polymers have an increased number of terminuses, which is effective for improving adhesion to substrates. The polymers can be designed as desired since the number of branches and terminuses can be freely controlled.

DESCRIPTION OF THE PREFERRED EMBODIMENT

The polymer or high molecular weight compound of the invention is a dendritic or hyperbranched polymer of a phenol derivative having a weight average molecular weight of 500 to 10,000,000.

Preferably the polymer is comprised of recurring units (I) and/or recurring units (II) and recurring units (III) as shown below. The number of units (III) is 1 to 1,000, more preferably 1 to 500, and most preferably 1 to 200.

units (I):

(1)

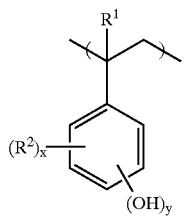

units (II):

(2)

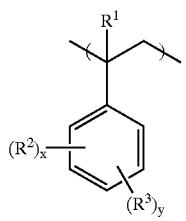

Herein $R^1$ is hydrogen or methyl, $R^2$, which may be the same or different, is a straight, branched or cyclic alkyl group of 1 to 30 carbon atoms or aryl group of 6 to 30 carbon atoms, $R^3$ is a hydroxyl or $OR^4$ group, $R^4$ is an acid labile group or acid stable group, x is 0 or a positive integer, y is a positive integer, satisfying $x+y \leq 5$. Preferably, $R^3$ is $OR^4$.

units (III):

(3)

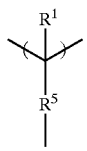

Herein $R^1$ is as defined above, and $R^5$ is a straight, branched or cyclic alkylene group of 1 to 30 carbon atoms or arylene group of 6 to 30 carbon atoms, or a mixture thereof, which may contain an ether or ester bond.

More preferably, the units (III) are of the following formula (3a):

(3a)

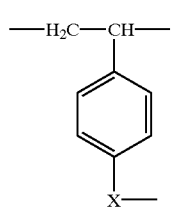

wherein X is a valence bond or a straight or branched alkylene group of 1 to 10 carbon atoms which may contain a hydroxyl or carbonyl group.

More illustratively, $R^2$ represents straight, branched or cyclic alkyl groups or aryl groups of 1 to 30 carbon atoms, preferably 1 to 15 carbon atoms, more preferably 1 to 8 carbon atoms. Exemplary of the straight, branched or cyclic alkyl groups are methyl, ethyl, propyl, isopropyl, n-butyl, isobutyl, tert-butyl, cyclohexyl, and cyclopentyl. Phenyl is an exemplary aryl group.

The acid labile group represented by $R^4$ may be selected from a variety of acid labile groups, preferably from groups of the following formulas (9) and (10), tert-alkyl groups of 4 to 40 carbon atoms, trialkylsilyl groups whose alkyl groups each have 1 to 6 carbon atoms, and oxoalkyl groups of 4 to 20 carbon atoms.

(9)

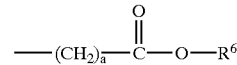

(10)

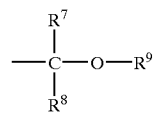

In formula (9), $R^6$ is selected from tert-alkyl groups of 4 to 40 carbon atoms, trialkylsilyl groups whose alkyl groups each have 1 to 6 carbon atoms, and oxoalkyl groups of 4 to 20 carbon atoms, and a is an integer of 0 to 10. In formula (10), $R^7$ is hydrogen or a straight, branched or cyclic alkyl group having 1 to 10 carbon atoms, and $R^8$ and $R^9$ are independently selected from straight, branched or cyclic alkyl groups having 1 to 10 carbon atoms, or $R^8$ and $R^9$, taken together, form a ring.

Examples of the acid labile group of formula (10) include straight or branched acetal groups such as 1-methoxyethyl, 1-ethoxyethyl, 1-n-propoxyethyl, 1-isopropoxyethyl, 1-n-butoxyethyl, 1-isobutoxyethyl, 1-sec-butoxyethyl, 1-tert-butoxyethyl, 1-tert-amyloxyethyl, 1-ethoxy-n-propyl, 1-cyclohexyloxyethyl, methoxypropyl, ethoxypropyl, 1-methoxy-1-methylethyl, and 1-ethoxy-1-methylethyl; and cyclic acetal groups such as tetrahydrofuranyl and tetrahydropyranyl, with the ethoxyethyl, butoxyethyl and ethoxypropyl groups being preferred. Examples of the acid labile group of formula (9) include tert-butoxycarbonyl, tert-butoxycarbonylmethyl, tert-amyloxycarbonyl, tert-amyloxycarbonylmethyl, 1-ethoxy-ethoxycarbonylmethyl, 2-tetrahydropyranyloxycarbonylmethyl, and 2-tetrahydrofuranyloxycarbonylmethyl groups.

Examples of the tertiary alkyl group include tert-butyl, triethylcarbyl, 1-ethylnorbornyl, 1-methylcyclohexyl, 2-(2-methyl)adamantyl and tert-amyl groups.

Examples of the trialkylsilyl group include those wherein alkyl moieties each have 1 to 6 carbon atoms such as trimethylsilyl, triethylsilyl and dimethyl-tert-butylsilyl groups.

A typical oxoalkyl group is 3-oxocyclohexyl.

Also included in the acid labile groups is a crosslinking group Q having a C—O—C linkage. This crosslinking group Q provides intra- or intermolecular crosslinking between OH groups in units (I), as shown below.

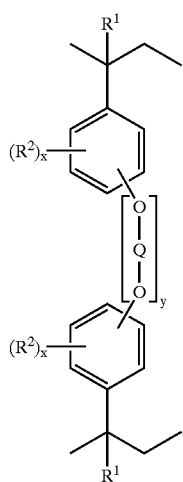

The crosslinking group Q is exemplified by groups of the following general formulas (Qa) and (Qb), preferably formulas (Qa') and (Qb').

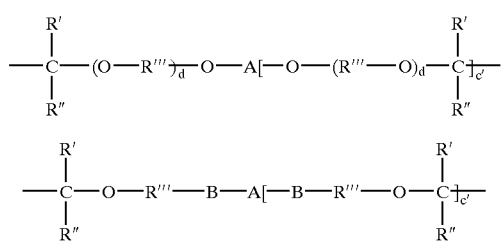

Herein, R' and R" each are hydrogen or a straight, branched or cyclic alkyl group of 1 to 8 carbon atoms, or R' and R", taken together, may form a ring, with the proviso that each of R' and R" is a straight or branched alkylene group of 1 to 8 carbon atoms when they form a ring. R'" is a straight, branched or cyclic alkylene group of 1 to 10 carbon atoms. Letter d is 0 or an integer of 1 to 10. A is a c-valent aliphatic or alicyclic saturated hydrocarbon group, aromatic hydrocarbon group or heterocyclic group of 1 to 50 carbon atoms, which may have an intervening hetero atom and in which the hydrogen atom attached to a carbon atom may be partially replaced by a hydroxyl group, carboxyl group, acyl group or halogen atom. B is —CO—O—, —NHCO—O— or —NHCONH—. Letter c is an integer of 2 to 8, and c' is an integer of 1 to 7.

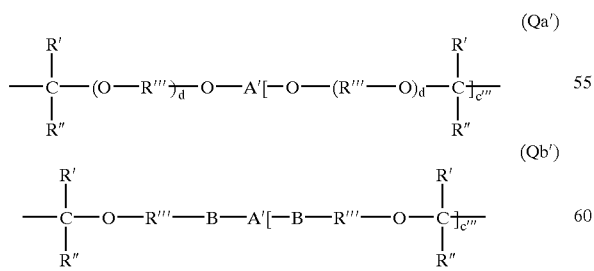

Herein, R' and R" each are hydrogen or a straight, branched or cyclic alkyl group of 1 to 8 carbon atoms, or R' and R", taken together, may form a ring, with the proviso that each of R' and R" is a straight or branched alkylene group of 1 to 8 carbon atoms when they form a ring. R'" is a straight, branched or cyclic alkylene group of 1 to 10 carbon atoms. Letter d is 0 or an integer of 1 to 5. A' is a c"-valent straight, branched or cyclic alkylene, alkyltrnyl or alkyltetrayl group of 1 to 20 carbon atoms or an arylene group of 6 to 30 carbon atoms, which may have an intervening hetero atom and in which the hydrogen atom attached to a carbon atom may be partially replaced by a hydroxyl group, carboxyl group, acyl group or halogen atom. B is —CO—O—, —NHCO—O— or —NHCONH—. Letter c" is an integer of 2 to 4, and c'" is an integer of 1 to 3.

The straight, branched or cyclic alkyl groups of 1 to 8 carbon atoms are as exemplified above. Examples of the straight, branched or cyclic alkylene group of 1 to 10 carbon atoms represented by R'" include methylene, ethylene, propylene, isopropylene, n-butylene, isobutylene, cyclohexylene, and cyclopentylene. Examples of the group represented by A are described later. These crosslinking groups of formulas (Qa) and (Qb) originate from alkenyl ether compounds and halogenated alkyl ether compounds to be described later.

As understood from the value of c' in formula (Qa) or (Qb), the crosslinking group is not limited to a divalent one and trivalent to octavalent groups are acceptable. For example, the divalent crosslinking group is exemplified by groups of the following formulas (Qa") and (Qb"), and the trivalent crosslinking group is exemplified by groups of the following formulas (Qa'") and (Qb'").

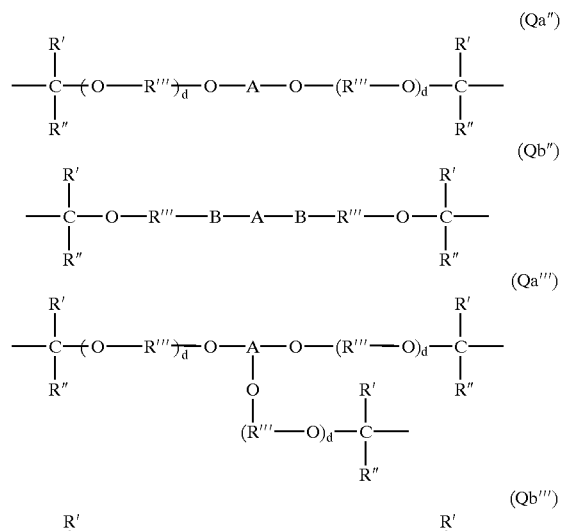

For introducing the above crosslinking groups, the following compounds may be used.

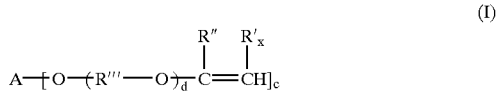

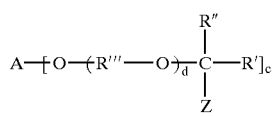 (I')

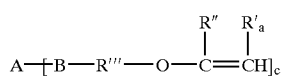 (II)

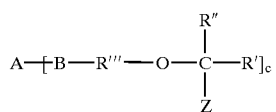 (II')

Herein A, B, R', R", R'", c and d are as defined above, R'a is hydrogen or a straight, branched or cyclic alkyl group of 1 to 7 carbon atoms, and Z is a halogen atom such as Cl, Br or I.

The c-valent (divalent to octavalent) hydrocarbon groups represented by A include hydrocarbon groups, for example, substituted or unsubstituted alkylene groups having 1 to 50 carbon atoms, especially 1 to 40 carbon atoms, substituted or unsubstituted arylene groups having 6 to 50 carbon atoms, more preferably 6 to 40 carbon atoms, especially 6 to 20 carbon atoms, a combination of an alkylene group and an arylene group, and c'''-valent groups obtained by eliminating one hydrogen atom attached to a carbon atom from the foregoing groups wherein c''' is an integer of 3 to 8; and c-valent heterocyclic groups, and a combination of such a heterocyclic group with any one of the foregoing hydrocarbon groups. In the alkylene and arylene groups, a hetero atom such as O, NH, N(CH$_3$), S and SO$_2$ may intervene and where substituted, the substituent is a hydroxyl, carboxyl, acyl group or a halogen atom such as fluorine, chlorine, bromine or iodine.

Illustrative examples of A are given below.

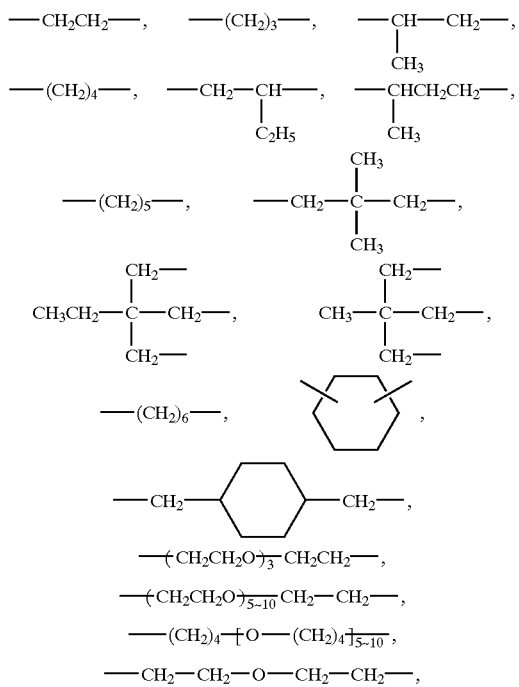

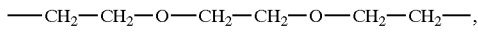
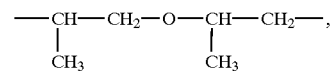
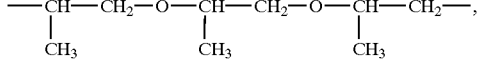
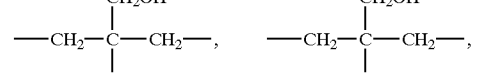
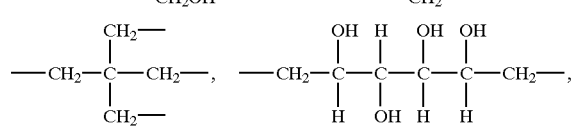
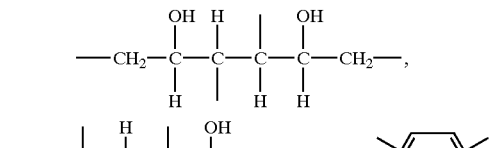
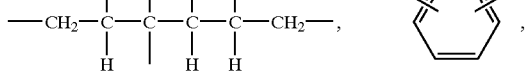
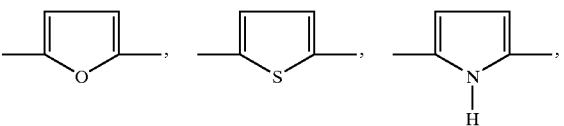
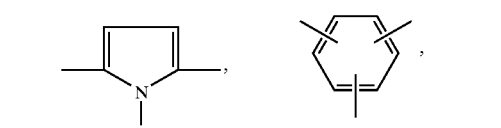
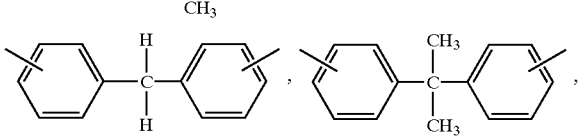
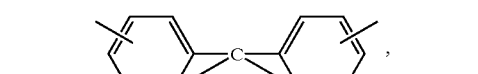
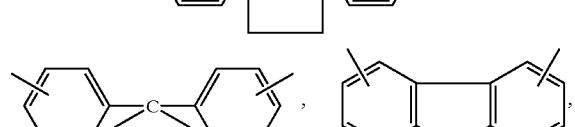
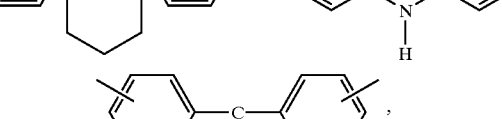
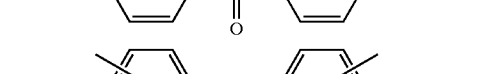
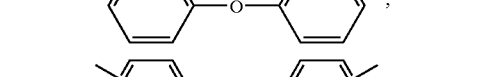
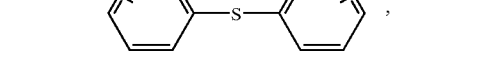

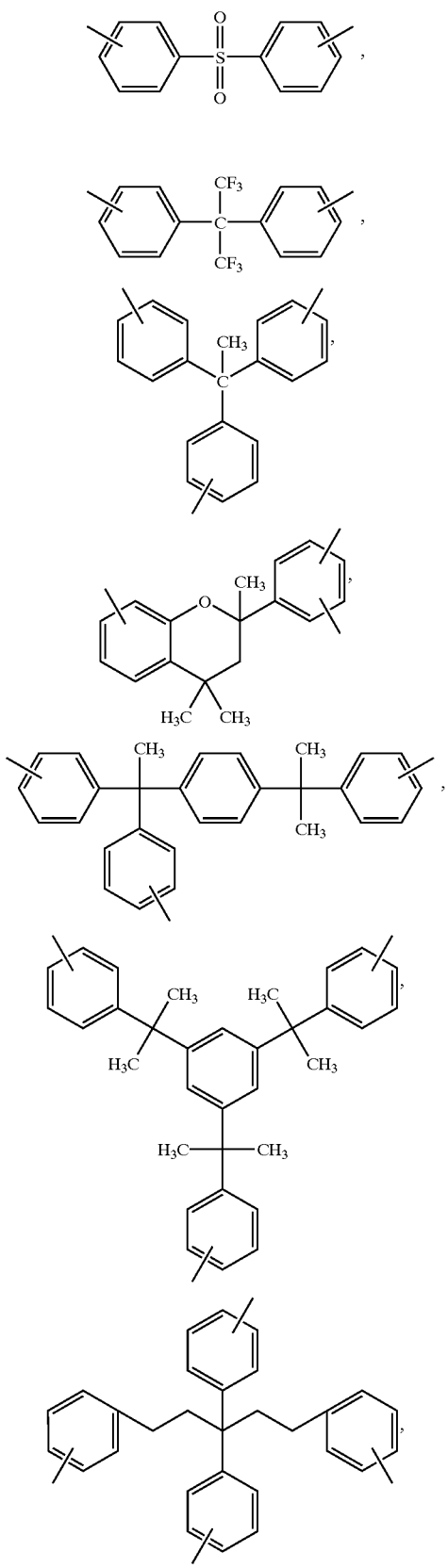

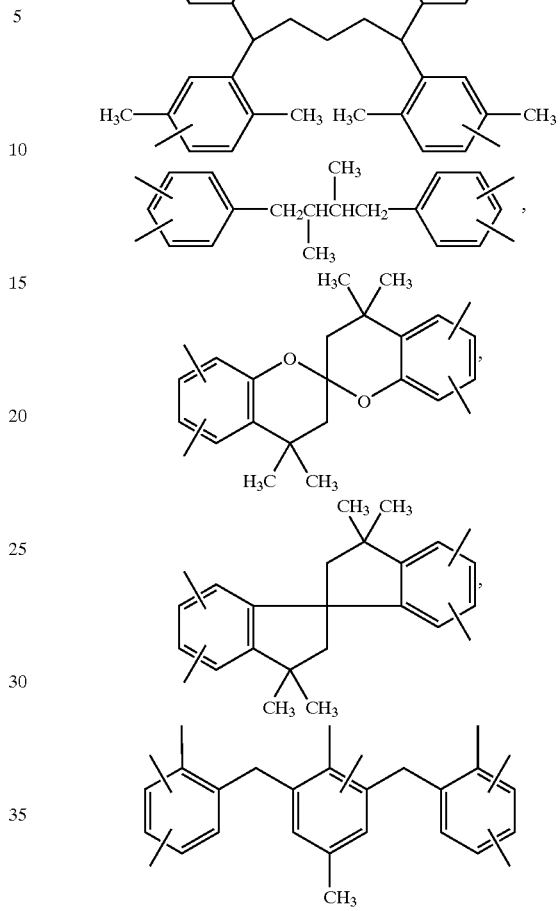

A method as described by Stephen C. Lapin in Polymers Paint Colour Journal, 179 (4237), 321 (1988) may be used to prepare the compounds of general formula (I). This method involves synthesis via the reaction of a polyhydric alcohol or a polyhydric phenol with acetylene, or the reaction of a polyhydric alcohol or polyhydric phenol with a halogenated alkyl vinyl ether.

Illustrative, non-limiting examples of compounds having formula (I) include ethylene glycol divinyl ether, triethylene glycol divinyl ether, 1,2-propanediol divinyl ether, 1,3-propanediol divinyl ether, 1,3-butanediol divinyl ether, 1,4-butanediol divinyl ether, tetramethylene glycol divinyl ether, neopentyl glycol divinyl ether, trimethylolpropane trivinyl ether, trimethylolethane trivinyl ether, hexanediol divinyl ether, 1,4-cyclohexanediol divinyl ether, 1,4-divinyloxymethyl cyclohexane, tetraethylene glycol divinyl ether, pentaerythritol divinyl ether, pentaerythritol trivinyl ether, pentaerythritol tetravinyl ether, sorbitol tetravinyl ether, sorbitol pentavinyl ether, ethylene glycol diethylene vinyl ether, triethylene glycol diethylene vinyl ether, ethylene glycol dipropylene vinyl ether, triethylene glycol diethylene vinyl ether, trimethylolpropane triethylene vinyl ether, trimethylolpropane diethylene vinyl ether, pentaerythritol diethylene vinyl ether, pentaerythritol triethylene vinyl ether, pentaerythritol tetraethylene vinyl ether, and compounds of the formulas (I-1) to (I-31) given below.
(I-1)
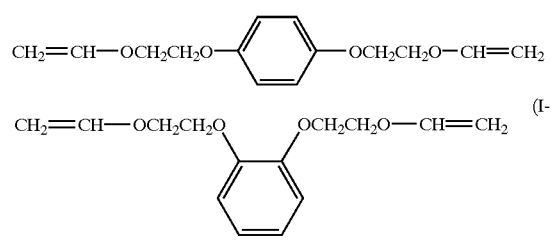
(I-2)
(I-3)
(I-4)
(I-5)
(I-6)
(I-7)
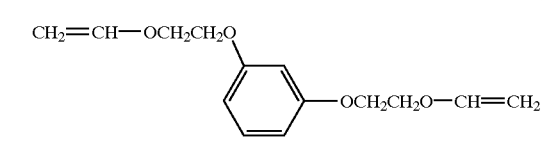
(I-8)
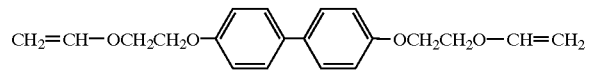
(I-9)
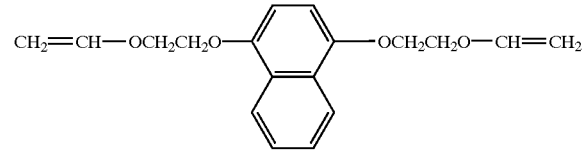
(I-10)
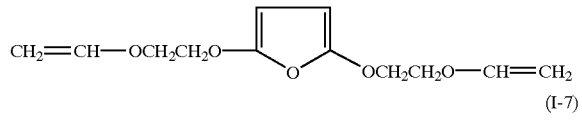
(I-11)
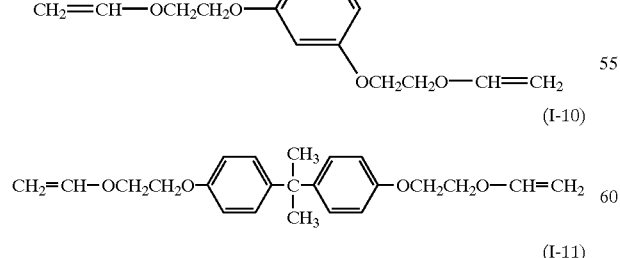
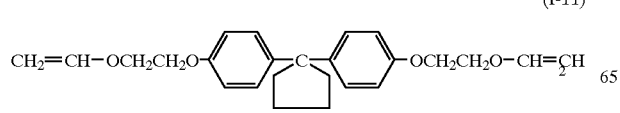
(I-12)
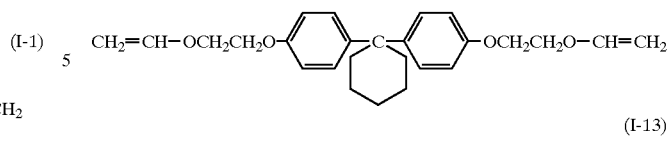
(I-13)
(I-14)
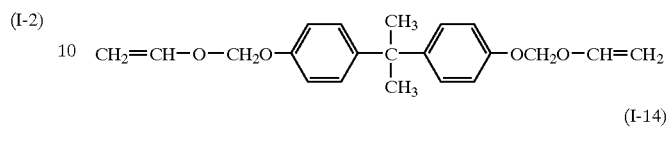
(I-15)
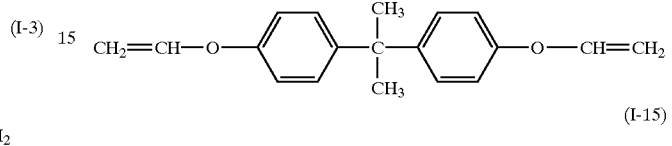
(I-16)
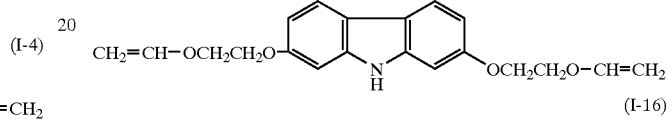
(I-17)
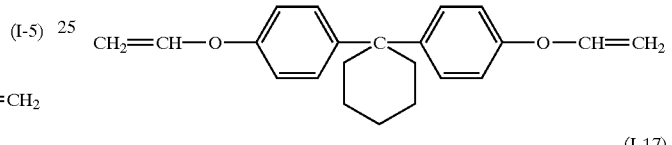
(I-18)
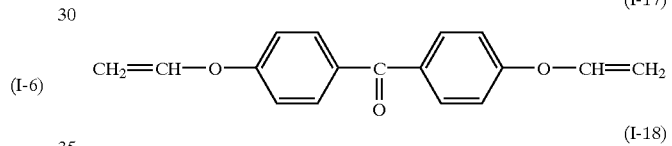
(I-19)
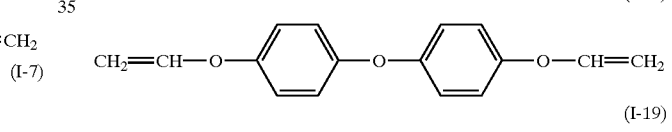
(I-20)
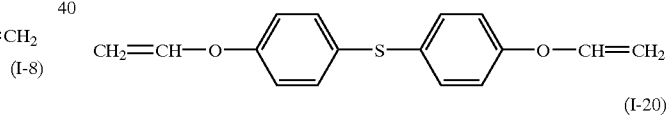
(I-21)
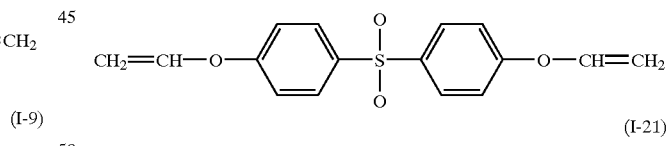
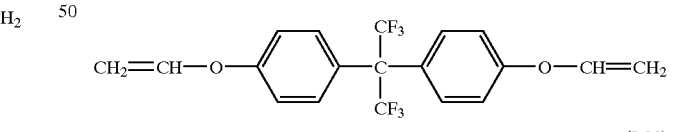
(I-22)
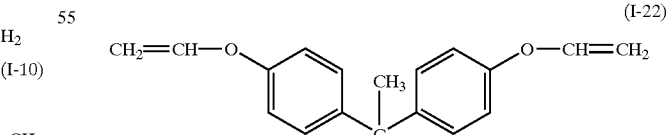
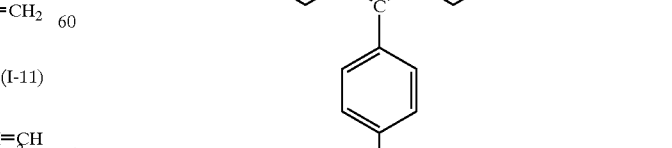

-continued (I-23)
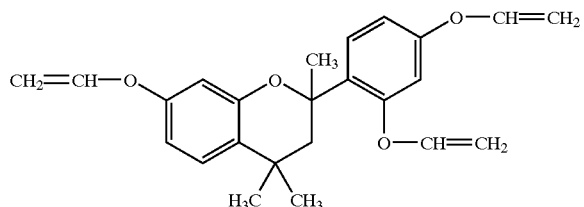

(I-24)
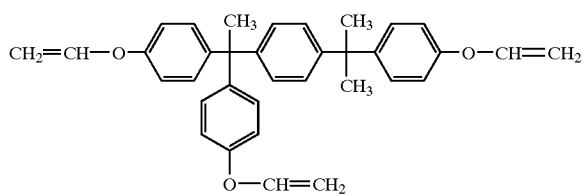

(I-25)
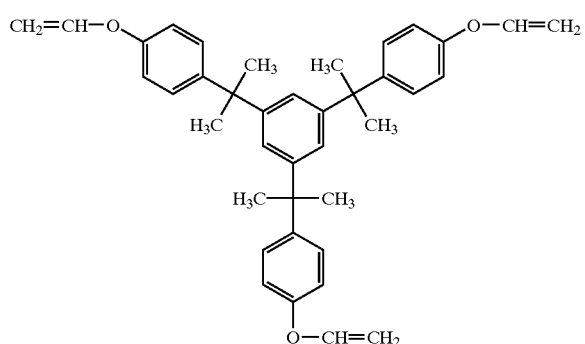

(I-26)
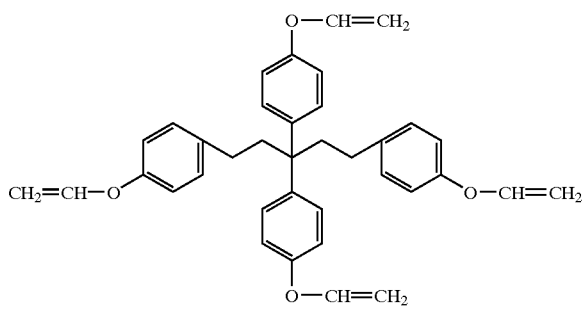

(I-27)
(I-28)
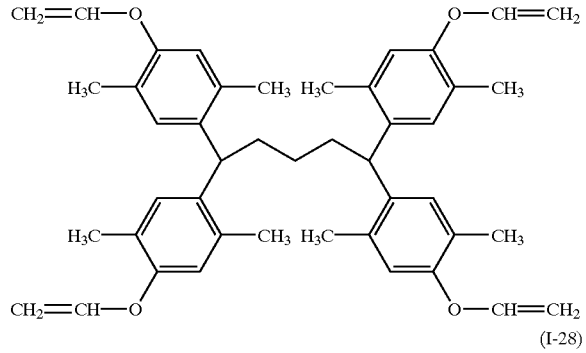

-continued (I-29)
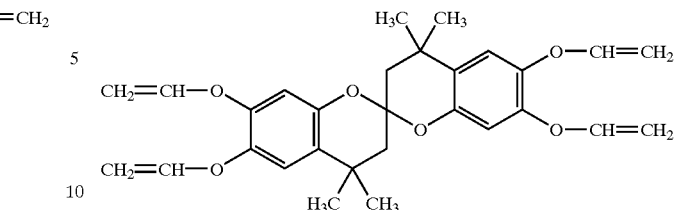

(I-30)
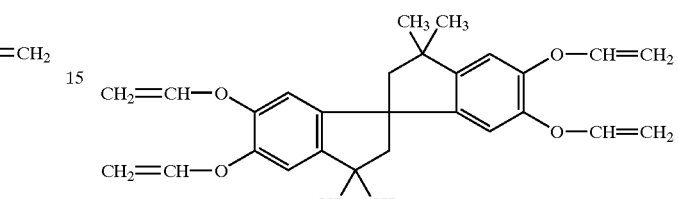

(I-31)
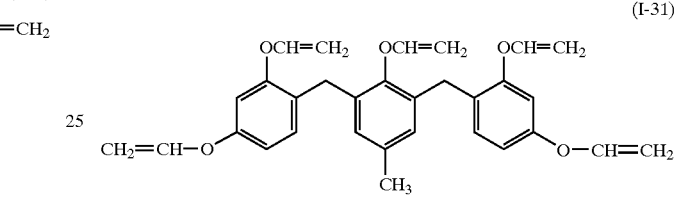

When B is —CO—O—, the compound of general formula (II) above may be prepared by reacting a polycarboxylic acid with a halogenated alkyl vinyl ether. Illustrative, non-limiting examples of compounds having formula (II) in which B is —CO—O— include diethylene vinyl ether terephthalate, diethylene vinyl ether phthalate, diethylene vinyl ether isophthalate, dipropylene vinyl ether phthalate, dipropylene vinyl ether terephthalate, dipropylene vinyl ether isophthalate, diethylene vinyl ether maleate, diethylene vinyl ether fumarate, and diethylene vinyl ether itaconate.

Examples of alkenyl ether group-containing compounds which are highly suitable for use in the invention include alkenyl ether group-containing compounds prepared by reacting an active hydrogen-bearing alkenyl ether compound of general formula (III), (IV), or (V) below, for example, with an isocyanate group-bearing compound.

(III)
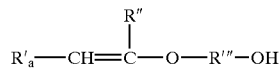

(IV)
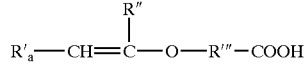

(V)
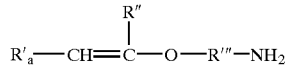

In these formulas, R'a, R", and R'" are as defined above.

When B is —NHCO—O— or —NHCONH—, examples of the isocyanate group-bearing compound of general formula (II) above which may be used include the compounds mentioned in Handbook of Crosslinking Agents, Taisei K. K., 1981. Illustrative examples include polyisocyanate compounds such as triphenylmethane triisocyanate, diphenylmethane diisocyanate, tolylene diisocyanate, the dimer of 2,4-tolylene diisocyanate, naphthalene-1,5-diisocyanate, o-tolylene diisocyanate, polymethylene polyphenyl isocyanate, and hexamethylene diisocyanate; and polyisocyanate adducts such as the adduct of tolylene diisocyanate and trimethylolpropane, the adduct of hexamethylene diisocyanate and water, and the adduct of xylene diisocyanate and trimethylolpropane. Various compounds with terminal alkenyl ether groups may be obtained by reacting the above-mentioned isocyanate group-bearing compounds with the active hydrogen-bearing alkenyl ether compounds. Illustrative, non-limiting examples of such compounds include those of the following formulas (II-1) to (II-11).

(II-1)

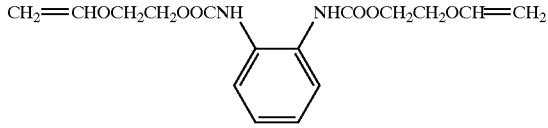

(II-2)

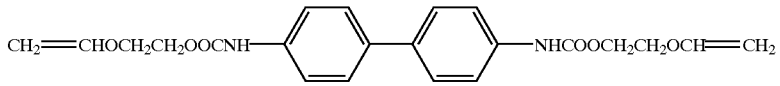

(II-3)

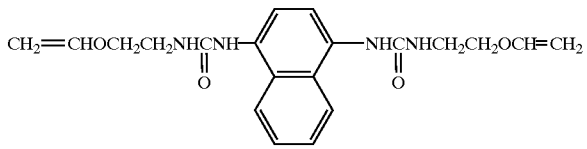

(II-4)

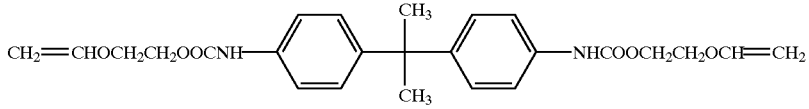

(II-5)

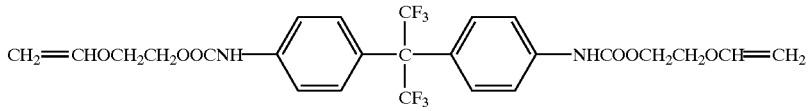

(II-6)

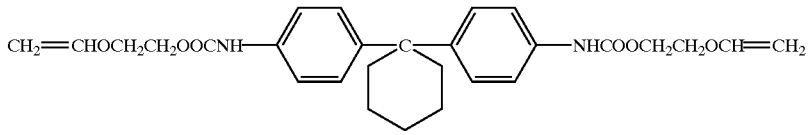

(II-7)

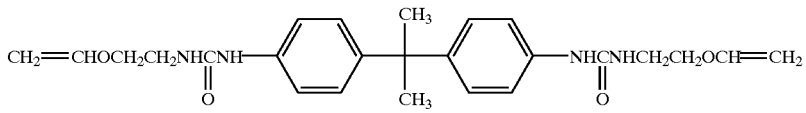

(II-8)

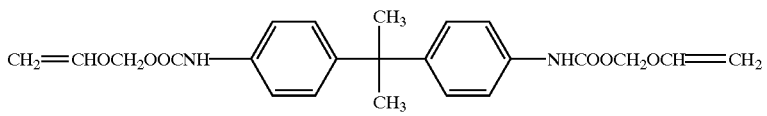

(II-9)

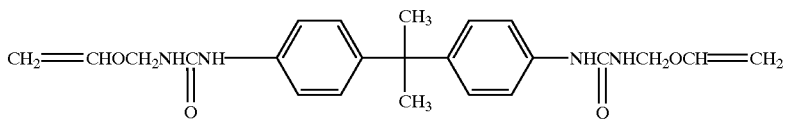

(II-10)

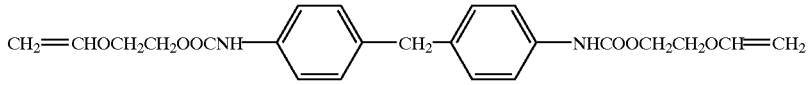

(II-11)

The acid stable group represented by $R^4$ designates a substituent other than the substituent which is eliminated under the action of an acid to produce a phenol to change a rate of dissolution, and includes primary and secondary alkyl groups, primary and secondary alkoxy groups, primary and secondary alkoxycarbonyl groups, primary, secondary and tertiary alkylcarbonyl groups, and aryl groups. The alkyl and alkoxy groups are preferably those of 1 to 20 carbon atoms, especially 1 to 10 carbon atoms. An exemplary aryl group is phenyl. Illustrative, non-limiting examples include methoxy, ethoxy, propoxy, cyclohexyloxy, acetyl, pivaloyl, methylcarbonate, ethylcarbonate, isopropylcarbonate, and methoxymethoxy.

$R^5$ represents alkylene and arylene groups. The alkylene groups are preferably those of 1 to 20 carbon atoms, especially 1 to 10 carbon atoms. The arylene groups are preferably those of 6 to 20 carbon atoms, especially 6 to 10 carbon atoms. A combination of an alkylene group with an arylene group is also useful. These groups and combinations may have ether or ester bonds therein. Illustrative examples include methylene, ethylene, propylene, butylene, hexylene, cyclohexylene, octylene, phenylene, and combinations of any two or more of these groups, which may be separated by —O—, —CO— or —COO—. Preferred are groups represented by the following formula.

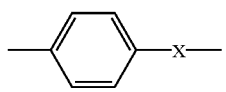

Herein, X is a valence bond or a straight or branched alkylene group of 1 to 10 carbon atoms, preferably 1 to 8 carbon atoms, more preferably 1 to 6 carbon atoms, which may contain a hydroxyl or carbonyl group. Examples of the alkylene group are the same as exemplified above.

The polymer of the invention is a macromolecule which is branched and concatenated in the dendritic or hyperbranched manner that recurring units (I) and/or (II) at one of their two bond sites are attached to the three bond sites of one unit (III) and at the other of their two bond sites to the three bond sites of another unit (III).

The recurring units (I) and (II) are combined such that (II)/[(I)+(II)] may range from 0 to 1, preferably up to 0.8, more preferably up to 0.6, and most preferably up to 0.5. The lower limit of (II)/[(I)+(II)] is 0, preferably a positive number exclusive of 0, more preferably at least 0.01, further preferably at least 0.05, and most preferably at least 0.1.

More illustratively, the polymer of the invention is represented by the following formula (A).

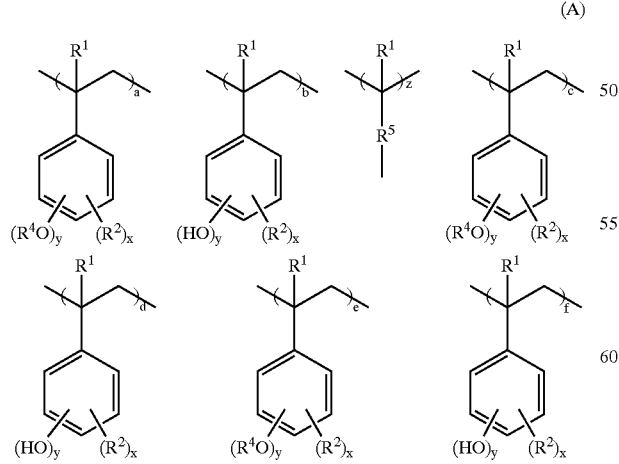

(A)

Depending on the value of z representing the number of recurring units (III) wherein z varies with the number of branches, preferably from 1 to 1,000, more preferably from 1 to 100, and most preferably 1 to 50, recurring units "a" and "b", recurring units "c" and "d", and recurring units "e" and "f" are attached to the three bond sites of each recurring unit (III).

$R^1$, $R^2$, $R^4$, and $R^5$ are as defined above, and x and y are as defined above.

The letters "a" to "f" are 0 or positive numbers, with the proviso that each pair of "a" and "b", "c" and "d", and "e" and "f" are not equal to 0 at the same time. The values of a/(a+b), c/(c+d), e/(e+f), and (a+c+e)/(a+b+c+d+e+f) range from 0 to 1. Like the above-mentioned range of (II)/[(I)+(II)], these values are preferably up to 0.8, more preferably up to 0.6, and most preferably up to 0.5. The lower limit of these values is 0, preferably a positive number exclusive of 0, more preferably at least 0.01, further preferably at least 0.05, and most preferably at least 0.1. These values may be identical or different.

As previously described, the polymers of the invention have a weight average molecular weight (Mw) of 500 to 10,000,000, preferably 1,000 to 1,000,000, more preferably 1,000 to 100,000, and most preferably 2,000 to 50,000. The molecular weight distribution or dispersity represented by Mw/Mn is preferably from 1.0 to 5.0, more preferably from 1.0 to 3.0, though not critical.

Illustrative examples of the dendritic or hyperbranched polymers of the invention are those having recurring units represented by at least one of the following approximate formulae (4) to (8).

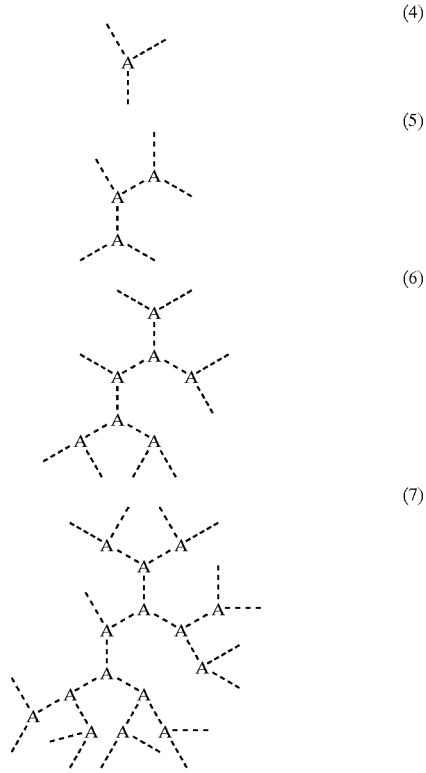

(8)

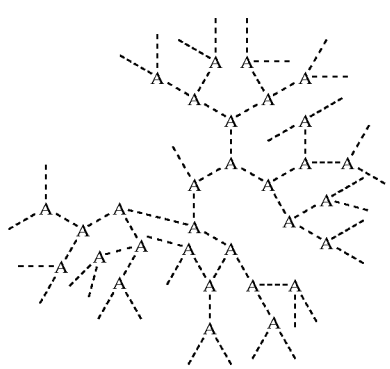

Herein, broken lines represent polymer chains of the recurring units (I) and/or (II), and A represents the units (III). The number of broken line segments between A and A is depicted merely for the sake of convenience, independent of the number of recurring units (I) and (II) included between A and A.

According to the invention, the dendritic or hyperbranched polymer is prepared by effecting living polymerization of a phenol derivative, reacting with a compound having a polymerizable moiety and a terminating moiety and proceeding further polymerization. By repeating this operation, a dendritic or hyperbranched polymer of a phenol derivative can be synthesized. The living polymerization may be effected by any desired technique although living anion polymerization is preferred because of ease of control.

For example, living anion polymerization is initiated using a first monomer of the general formula (i) and/or a second monomer of the general formula (ii). After a predetermined amount of the monomer or monomers is polymerized to form an intermediate, a branching monomer of the general formula (iii) is added and reacted with the intermediate. Then the first monomer of formula (i) and/or the second monomer of formula (ii) are added again and polymerized. This operation is repeated until a desired polymer is obtained.

(i)

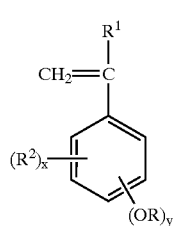

(ii)

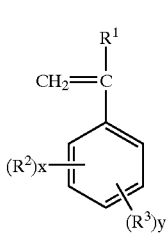

(iii)

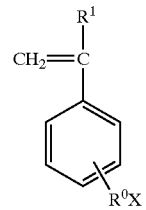

Herein $R^1$, $R^2$, $R^3$, x, and y are as defined above, R is a protective group for a hydroxyl group, $R^0$ is a valence bond or an alkylene group of 1 to 20 carbon atoms, preferably 1 to 10 carbon atoms, and X is a halogen atom, aldehyde group or alkoxycarbonyl group. The protective group represented by R is not critical and may be selected from well-known ones. The protective group can be finally eliminated by a conventional technique.

For living anion polymerization to take place, the reaction solvent is preferably selected from toluene, benzene, tetrahydrofuran, dioxane, and ethyl ether. Of these, polar solvents such as tetrahydrofuran, dioxane, and ethyl ether are preferable. They may be used alone or in admixture of two or more.

The initiator used herein is preferably selected from sec-butyl lithium, n-butyl lithium, naphthalene sodium and cumyl potassium. The amount of the initiator used is proportional to the design molecular weight.

Preferred reaction conditions include a temperature of −80° C. to 100° C., preferably −70° C. to 0° C., and a time of 0.1 to 50 hours, preferably 0.5 to 5 hours.

One exemplary reaction scheme using sec-butyl lithium as the initiator is shown below. The degree of branching can be altered by repeating the reaction desired times.

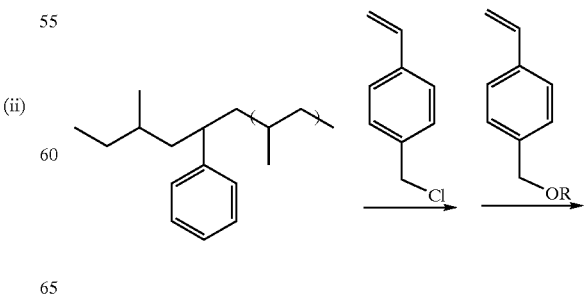

-continued

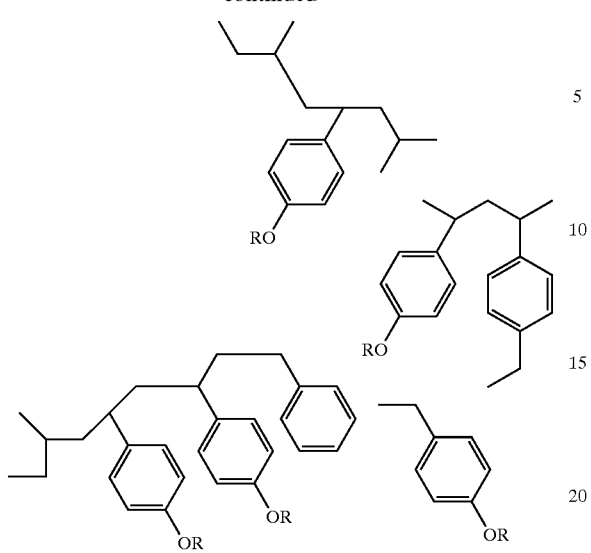

When acid labile groups or acid stable groups are to be introduced, the desired acid labile groups or acid stable groups may be introduced to the phenolic hydroxyl groups on the resulting poly(p-hydroxystyrene) by a well-known technique. Alternatively, polymerization may be effected as above using a hydroxystyrene derivative monomer having acid labile groups or acid stable groups introduced to its phenolic hydroxyl groups.

One exemplary process entailing the introduction of acid labile groups is shown below.

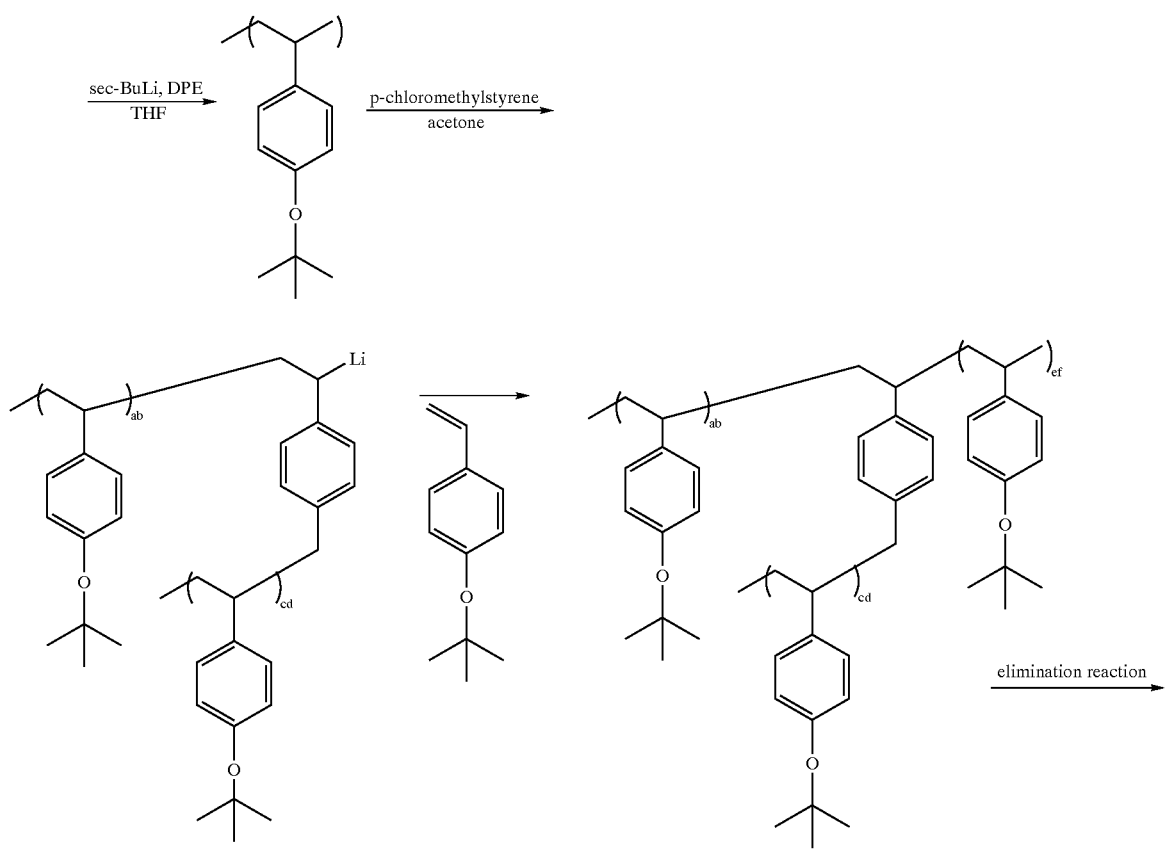

-continued
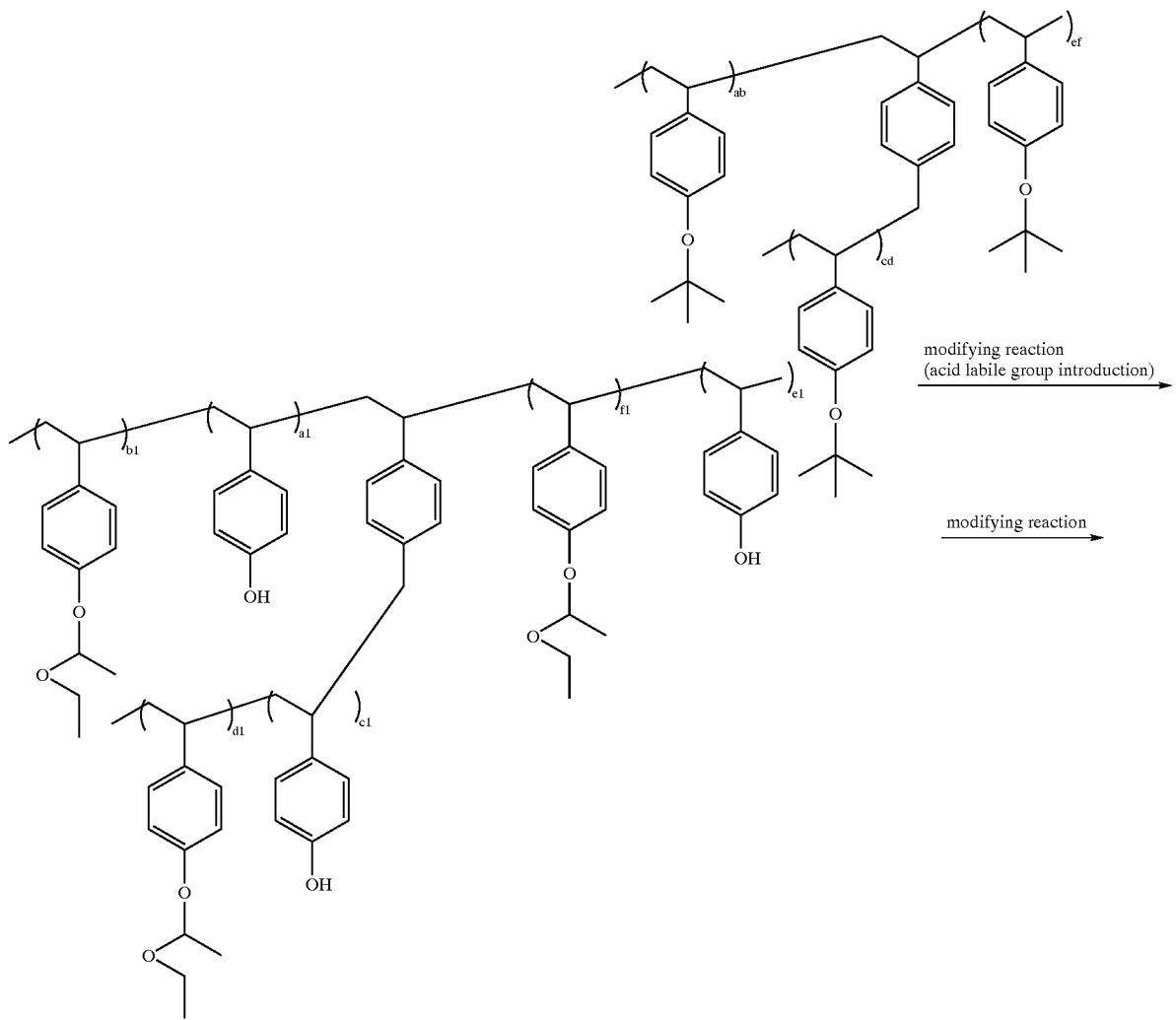

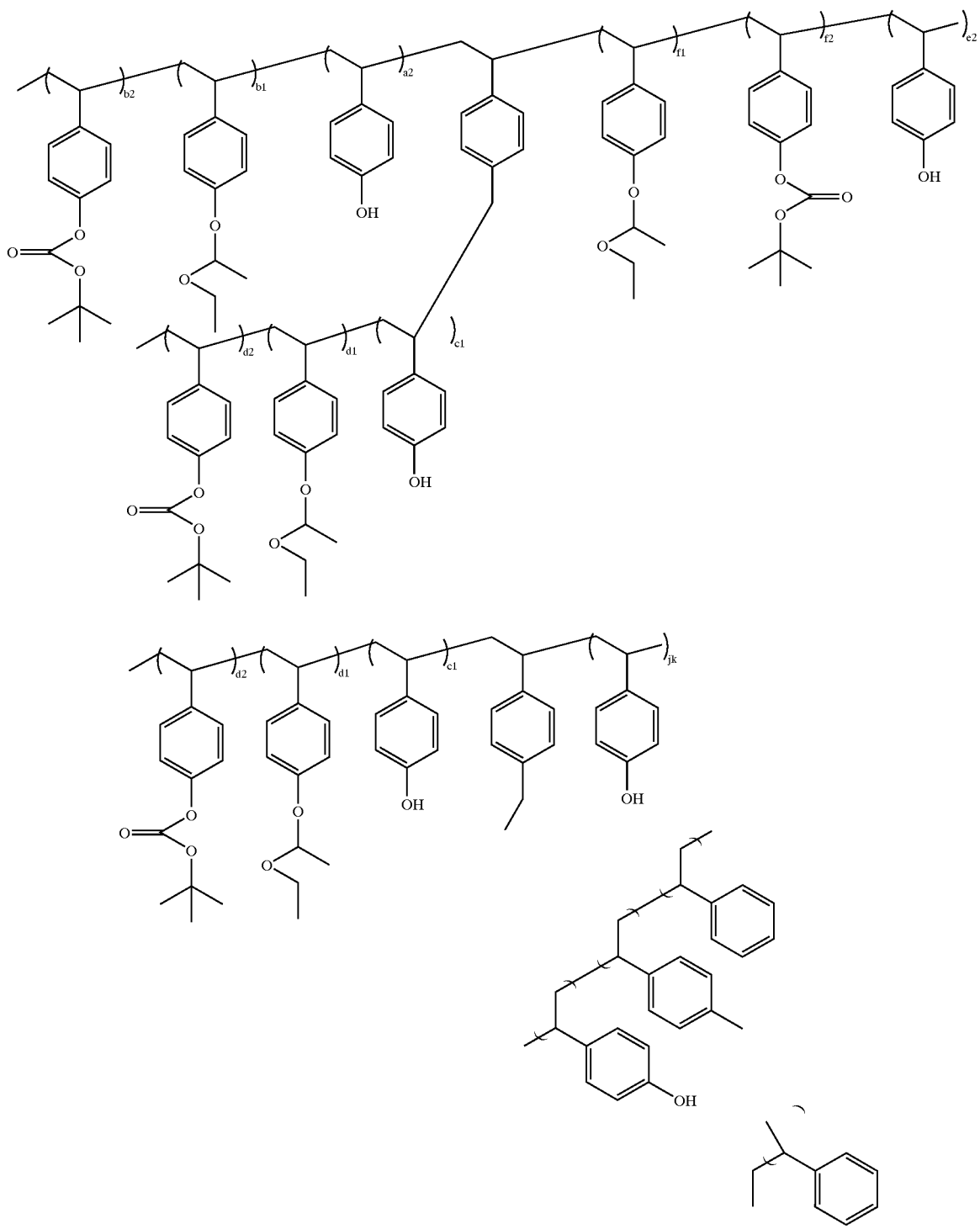

The novel polymers in the form of dendritic or hyperbranched polymers according to the invention essentially differ from conventional linear polymers. When polymers are used as the base resin of resist materials where the resolution is in proportion to the size of a polymer, for example, the conventional linear polymers have the drawback that reducing the size of a polymer leads to a lowering of strength. By contrast, the novel polymers of the invention permit the polymer size to be changed as desired and have the advantage that the size of a polymer can be reduced while maintaining strength. Then the novel polymers offer resist materials which have a high resolution, sensitivity and plasma etching resistance which have never been achieved with prior art resist materials.

EXAMPLE

Examples of the invention are given below by way of illustration and not by way of limitation. It is noted that dispersity is a molecular weight distribution (Mw/Mn) defined as weight average molecular weight (Mw) divided by number average molecular weight (Mn).

Synthetic Example 1
Synthesis of tri-branched poly(p-hydroxystyrene)

A 1-liter flask was charged with 500 ml of tetrahydrofuran as a solvent and 0.01 mol of sec-butyl lithium as an initiator. To the solution at −78° C. was added 30 g of p-tert-butoxystyrene. With stirring, polymerization reaction was effected for 30 minutes. The reaction solution turned red. For producing a branched polymer, 0.005 mol of p-chloromethylstyrene was added to the reaction solution whereupon reaction was effected for 5 minutes. The reaction solution was red. Further 15 g of p-tert-butoxystyrene was added. With stirring, polymerization reaction was effected for 30 minutes. Polymerization was stopped by adding 0.1 mol of methanol to the reaction solution.

For purifying the polymer, the reaction mixture was poured into methanol whereupon the polymer precipitated. Separation and drying yielded 29 g of a white polymer which was tri-branched poly(p-tert-butoxystyrene). The polymer was found to have a weight average molecular weight of 4,500 g/mol as measured by the light scattering method and to be monodisperse enough to have a dispersity (Mw/Mn) of 1.07 as determined from the GPC elution curve.

For producing tri-branched poly(p-hydroxystyrene), 29 g of the above tri-branched poly(p-tert-butoxystyrene) was dissolved in 300 ml of conc. A minor amount of conc. hydrochloric acid was added to the solution at 60° C., which was stirred for 7 hours. The reaction solution was poured into water whereupon the polymer precipitated. Washing and drying yielded 18 g of a polymer. The polymer had a weight average molecular weight of 3,000 g/mol. Since a peak attributable to tert-butyl group was not found in the proton-NMR spectrum, this polymer was confirmed to be tri-branched poly(p-hydroxystyrene) having a narrow dispersity.

Synthetic Example 2
Synthesis of tri-branched poly(p-hydroxystyrene)

A 1-liter flask was charged with 500 ml of tetrahydrofuran as a solvent and 0.01 mol of sec-butyl lithium as an initiator. To the solution at −78° C. was added 30 g of p-tert-butoxystyrene. With stirring, polymerization reaction was effected for 30 minutes. The reaction solution turned red. For producing a branched polymer, 0.005 mol of p-methylcarbonylstyrene was added to the reaction solution whereupon reaction was effected for 5 minutes. Further 15 g of p-tert-butoxystyrene was added. With stirring, polymerization reaction was effected for 30 minutes. Polymerization was stopped by adding 0.1 mol of methanol to the reaction solution.

For purifying the polymer, the reaction mixture was poured into methanol whereupon the polymer precipitated. Separation and drying yielded 28 g of a white polymer which was tri-branched poly(p-tert-butoxystyrene). The polymer was found to have a weight average molecular weight of 4,500 g/mol as measured by the light scattering method and to be monodisperse enough to have a dispersity (Mw/Mn) of 1.09 as determined from the GPC elution curve.

For producing tri-branched poly(p-hydroxystyrene), 28 g of the above tri-branched poly(p-tert-butoxystyrene) was dissolved in 300 ml of acetone. A minor amount of conc. hydrochloric acid was added to the solution at 60° C., which was stirred for 7 hours. The reaction solution was poured into water whereupon the polymer precipitated. Washing and drying yielded 17 g of a polymer. The polymer had a weight average molecular weight of 3,000 g/mol. Since a peak attributable to tert-butyl group was not found in the proton-NMR spectrum, this polymer was confirmed to be tri-branched poly(p-hydroxystyrene) having a narrow dispersity.

Synthetic Example 3
Synthesis of tri-branched poly(partially ethoxyethoxylated p-hydroxystyrene)

The tri-branched polyhydroxystyrene obtained in Synthetic Example 1, 10 g, was dissolved in 100 ml of tetrahydrofuran and a catalytic amount of methanesulfonic acid was added. With stirring at 20° C., 3 g of ethyl vinyl ether was added to the solution. Reaction was effected for one hour whereupon the reaction solution was neutralized with conc. aqueous ammonia. The neutralized reaction solution was added dropwise to 5 liters of water whereupon a white solid settled out. The solid was collected by filtration and dissolved in 100 ml of acetone, and added dropwise to 5 liters of water again. The precipitate was collected by filtration and dried in vacuum, obtaining a polymer. On proton-NMR analysis of the polymer, it was found that 27% of the hydrogen atoms of hydroxyl groups in tri-branched polyhydroxystyrene were ethoxyethylated. The weight average molecular weight (Mw) and dispersity (Mw/Mn) of the polymer are shown in Table 1.

Synthetic Example 4
Synthesis of tri-branched poly(p-tert-butoxycarbonyloxystyrene-p-hydroxystyrene)

The tri-branched polyhydroxystyrene obtained in Synthetic Example 1, 20 g, was dissolved in 200 ml of pyridine. With stirring at 45° C., 10 g of di-tert-butyl dicarbonate was added to the solution. Reaction was effected for one hour whereupon the reaction solution was added dropwise to 3 liters of water whereupon a white solid settled out. The solid was collected by filtration and dissolved in 100 ml of acetone, and added dropwise to 5 liters of water again. The precipitate was collected by filtration and dried in vacuum, obtaining a polymer. On proton-NMR analysis of the polymer, it was found that 27% of the hydrogen atoms of hydroxyl groups in tri-branched polyhydroxystyrene were t-butoxycarbonylated (t-BOC). The weight average molecular weight (Mw) and dispersity (Mw/Mn) of the polymer are shown in Table 1.

Synthetic Example 5
Synthesis of tri-branched poly(p-1-ethoxypropoxystyrene-p-tert-butoxycarbonyloxystyrene-p-hydroxystyrene)

The tri-branched polyhydroxystyrene obtained in Synthetic Example 1, 20 g, was dissolved in 200 ml of tetrahydrofuran and a catalytic amount of methanesulfonic acid was added. With stirring at 20° C., 5 g of ethyl propenyl ether was added to the solution. Reaction was effected for one hour whereupon the reaction solution was neutralized with conc. aqueous ammonia. The neutralized solution was added dropwise to 10 liters of water whereupon a white solid settled out. The solid was collected by filtration and dissolved in 200 ml of acetone, and added dropwise to 10 liters of water again. The precipitate was collected by filtration and dried in vacuum, obtaining a polymer. On proton-NMR analysis of the polymer, it was found that 20% of the hydrogen atoms of hydroxyl groups in tri-branched polyhydroxystyrene were ethoxypropylated.

The partially ethoxypropylated tri-branched polyhydroxystyrene, 20 g, was dissolved in 200 ml of pyridine. With stirring at 45° C., 3 g of di-tert-butyl dicarbonate was added to the solution. Reaction was effected for one hour whereupon the reaction solution was added dropwise to 3 liters of water whereupon a white solid settled out. The solid was collected by filtration and dissolved in 100 ml of acetone, and added dropwise to 5 liters of water again. The precipitate was collected by filtration and dried in vacuum, obtaining a polymer. On proton-NMR analysis of the polymer, it was found that the hydrogen atoms of hydroxyl groups in tri-branched polyhydroxystyrene were 20% ethoxypropylated and 8% t-butoxycarbonylated (t-BOC). The weight average molecular weight (Mw) and dispersity (Mw/Mn) of the polymer are shown in Table 1.

Synthetic Example 6

Synthesis of nona-branched poly(p-hydroxystyrene) and nona-branched poly(partially ethoxypropylated p-hydroxystyrene)

A 2-liter flask was charged with 1000 ml of tetrahydrofuran as a solvent and 0.06 mol of sec-butyl lithium as an initiator. To the solution at −78° C. was added 60 g of p-tert-butoxystyrene. With stirring, polymerization reaction was effected for 30 minutes. The reaction solution turned red. For producing a tri-branched polymer, 0.03 mol of p-chloromethylstyrene was added to the reaction solution whereupon reaction was effected for 5 minutes. Then 30 g of p-tert-butoxystyrene was added to the reaction solution, which was stirred for 30 minutes for polymerization. The reaction solution was red. For producing penta-branched polymer, 0.015 mol of p-chloromethylstyrene was added to the reaction solution whereupon reaction was effected for 5 minutes. Then 15 g of p-tert-butoxystyrene was added to the reaction solution, which was stirred for 30 minutes for polymerization. The reaction solution was red. Finally for producing nona-branched polymer, 0.0075 mol of p-chloromethylstyrene was added to the reaction solution whereupon reaction was effected for 5 minutes. 7.5 g of p-tert-butoxystyrene was added to the reaction solution, which was stirred for 30 minutes for polymerization. The reaction solution was red.

Further 10 g of p-tert-butoxystyrene was added to the reaction solution. With stirring, polymerization reaction was effected for 30 minutes. Polymerization was stopped by adding 0.1 mol of carbon dioxide gas to the reaction solution.

For purifying the polymer, the reaction mixture was poured into methanol whereupon the polymer precipitated. Separation and drying yielded 99 g of a white polymer which was nona-branched poly(p-tert-butoxystyrene). The polymer was found to have a weight average molecular weight of 4,000 g/mol as measured by the light scattering method and to be monodisperse enough to have a dispersity (Mw/Mn) of 1.21 as determined from the GPC elution curve.

For converting to nona-branched poly(p-hydroxystyrene), 99 g of the above nona-branched poly(p-tert-butoxystyrene) was dissolved in 1000 ml of acetone. A minor amount of conc. hydrochloric acid was added to the solution at 60° C., which was stirred for 7 hours. The reaction solution was poured into water whereupon the polymer precipitated. Washing and drying yielded 66 g of a polymer. The polymer had a weight average molecular weight of 3,000 g/mol. Since a peak attributable to tert-butyl group was not found in the proton-NMR spectrum, this polymer was confirmed to be nona-branched poly(p-hydroxystyrene) having a narrow dispersity.

In a 2-liter flask, 99 g of the nona-branched poly(p-hydroxystyrene) thus obtained was dissolved in 1000 ml of tetrahydrofuran and a catalytic amount of methanesulfonic acid was added. With stirring at 20° C., 25 g of ethyl propenyl ether was added to the solution. Reaction was effected for 2 hours whereupon the reaction solution was neutralized with conc. aqueous ammonia. The neutralized solution was added dropwise to 10 liters of water whereupon a white solid settled out. The solid was collected by filtration and dissolved in 500 ml of acetone, and added dropwise to 10 liters of water again. The precipitate was collected by filtration and dried in vacuum, obtaining a polymer. On proton-NMR analysis of the polymer, it was found that 26% of the hydrogen atoms of hydroxyl groups in carboxylic acid-terminated polyhydroxystyrene were ethoxypropylated. The weight average molecular weight (Mw) and dispersity (Mw/Mn) of the polymer are shown in Table 1.

TABLE 1

| Polymer | Mw | Mw/Mn |
| --- | --- | --- |
| Synthetic Example 3 | 6000 | 1.1 |
| Synthetic Example 4 | 5400 | 1.09 |
| Synthetic Example 5 | 6200 | 1.09 |
| Synthetic Example 6 | 4500 | 1.25 |

Synthetic Example 7

Synthesis of nona-branched poly(partially ethoxyethoxylated p-hydroxystyrene)

In a 2-liter flask, 99 g of the nona-branched poly(p-hydroxystyrene) obtained in Synthetic Example 6 was dissolved in 1000 ml of tetrahydrofuran and a catalytic amount of methanesulfonic acid was added. With stirring at 20° C., 25 g of ethyl vinyl ether was added to the solution. Reaction was effected for 2 hours whereupon the reaction solution was neutralized with conc. aqueous ammonia. The neutralized solution was added dropwise to 10 liters of water whereupon a white solid settled out. The solid was collected by filtration and dissolved in 500 ml of acetone, and added dropwise to 10 liters of water again. The precipitate was collected by filtration and dried in vacuum, obtaining a polymer designated Polymer 1. By proton-NMR analysis, the rate of substitution of ethoxyethyl groups was determined.

The following Polymers 2 to 11 were prepared as above. It is noted that Polymer 5 was prepared by further crosslinking with 1,4-butane diol divinyl ether.

Polymer 1: nine branches

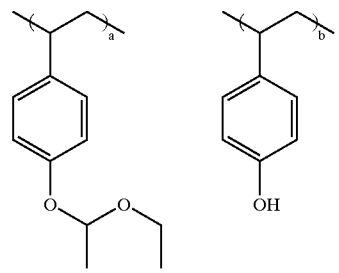

a : b = 0.24 : 0.76, Mw = 12,000, Mw/Mn = 1.40

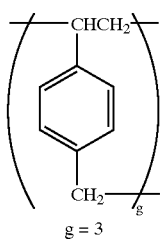
g = 3
Polymer 2: three branches
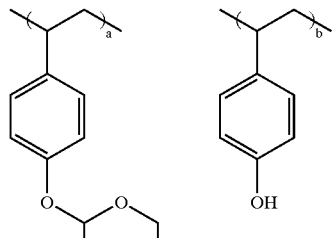
a : b = 0.3 : 0.7, Mw = 11,000, Mw/Mn = 1.20
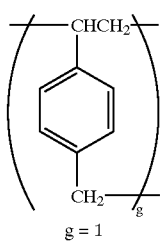
g = 1
Polymer 3: five branches
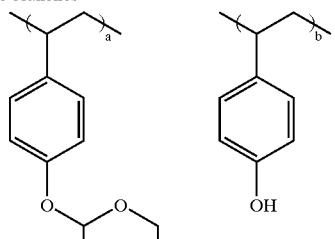
a : b = 0.26 : 0.74, Mw = 11,000, Mw/Mn = 1.30
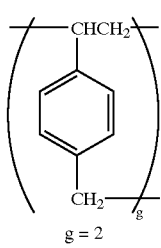
g = 2
Polymer 4: three branches
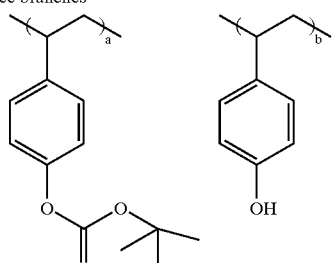
a : b = 0.26 : 0.74, Mw = 11,000, Mw/Mn = 1.20
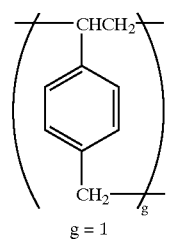
g = 1
Polymer 5: polymer with three branches is further crosslinked
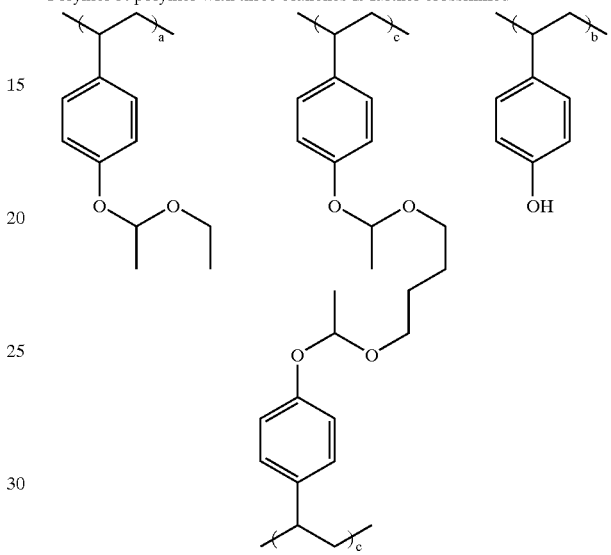
a : b : c = 0.22 : 0.72 : 0.06,
Mw = 24,000, Mw/Mn = 2.30
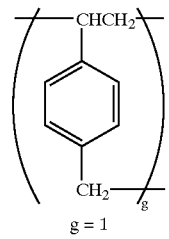
g = 1
Polymer 6: three branches
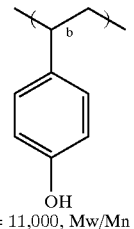
Mw = 11,000, Mw/Mn = 1.20
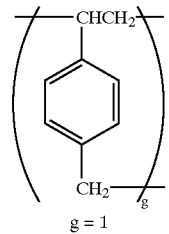
g = 1

Polymer 7: five branches

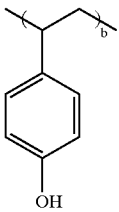

Mw = 11,000, Mw/Mn = 1.30

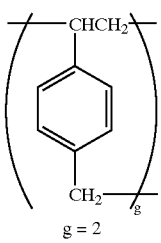

g = 2

Polymer 8: nine branches

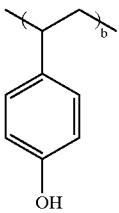

Mw = 12,000, Mw/Mn = 1.40

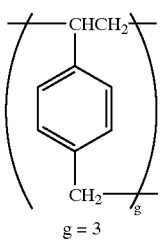

g = 3

Polymer 9: thirty three branches

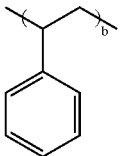

a : b = 0.20 : 0.80, Mw = 12,000, Mw/Mn = 1.80

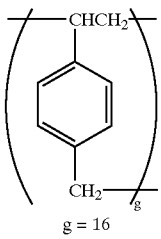

g = 16

Polymer 10: three branches

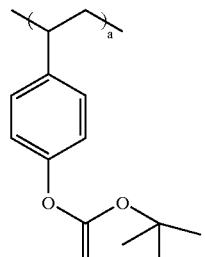

a : b = 0.10 : 0.90, Mw = 11,000, Mw/Mn = 1.20

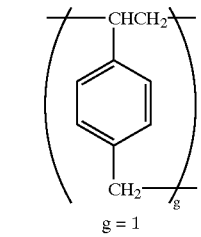

g = 1

Polymer 11: three branches

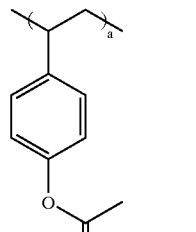

a : b = 0.10 : 0.90, Mw = 11,000, Mw/Mn = 1.20

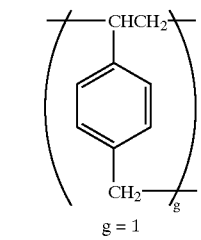

g = 1

Japanese Patent Application No. 11-082884 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A polymer in the form of a dendritic or hyperbranched polymer of a phenol derivative having a weight average molecular weight of 500 to 10,000,000 comprising recurring units of a compound of formula (1) or of a compound of formula (2) or both and recurring units of a compound of formula (3), wherein the number of recurring units of a compound of formula (3) is 1 to 1,000, (1)
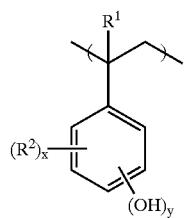

(2)
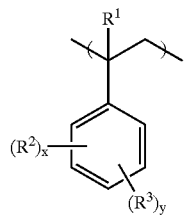

(3)
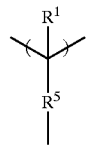

(7)
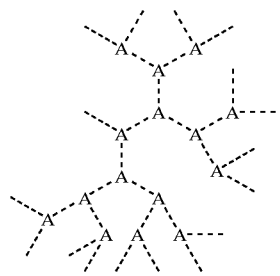

(8)
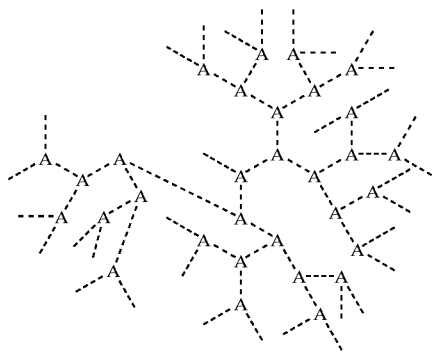

wherein in each case independently $R^1$ is hydrogen or methyl, $R^2$ is a straight-chain, branched or cyclic alkyl group of 1 to 30 carbon atoms or an aryl group of 6 to 30 carbon atoms, $R^3$ is hydroxyl or $OR^4$, $R^4$ is an acid labile group or acid stable group, $R^5$ is a straight-chain, branched or cyclic alkylene group of 1 to 30 carbon atoms or an arylene group of 6 to 30 carbon atoms, or a mixture thereof, which optionally comprises an ether or ester bond, x is 0 or a positive integer, y is a positive integer, and the sum of x and y is up to 5.

2. A polymer of claim 1 further comprising recurring units of a compound of formula (4), (5), (6), (7) or (8):

(4), (5), (6)
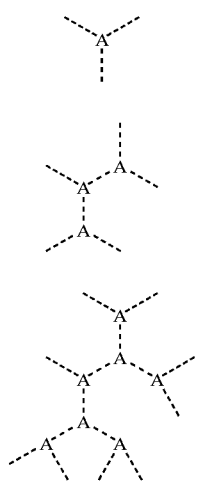

wherein broken lines represent polymer chains of the recurring units of a compound of formula (1) and/or (2), and A represents the units of a compound of formula (3).

3. A method for preparing a polymer of claim 1, comprising steps of polymerizing a hydroxystyrene derivative monomer into an intermediate and finally into a polymer, adding a branching monomer midway in the polymerization step to introduce branch chains into the intermediate, and repeating the polymerizing and branching steps until the desired polymer is obtained.

4. A method of claim 3, wherein the hydroxystyrene derivative monomer is a compound of formula (i) or (ii), and the branching monomer is a compound of formula (iii):

(i)
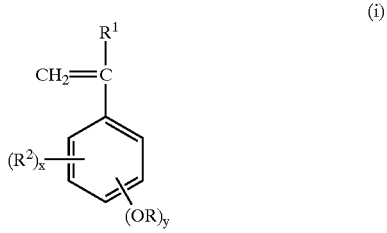

(ii)
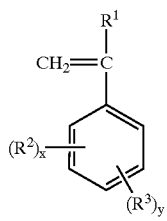

-continued (iii)

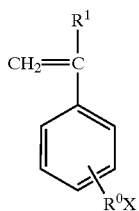

wherein in each case independently $R^1$ is hydrogen or methyl, $R^2$ is a straight-chain, branched or cyclic alkyl group of 1 to 30 carbon atoms or an aryl group of 6 to 30 carbon atoms, $R^3$ is hydroxyl or $OR^4$, $R^4$ is an acid labile group or acid stable group, x is 0 or a positive integer, y is a positive integer, and the sum of x and y is up to 5, R is a protective group for a hydroxyl group, $R^0$ is a valence bond or an alkylene group of 1 to 20 carbon atoms, and X is a halogen atom, aldehyde group or alkoxycarbonyl group.

5. A method of claim 3, wherein the polymerization step comprises living polymerization.

6. A method of claim 5, wherein the living polymerization is living anion polymerization.

7. A polymer in the form of a dendritic or hyperbranched polymer of a phenol derivative having a weight average molecular weight of 500 to 10,000,000 comprising recurring units of a compound of formula (1) or of a compound of formula (2) or both and recurring units of a compound of formula (3a), wherein the number of recurring units of a compound of formula (3a) is 1 to 1,000,

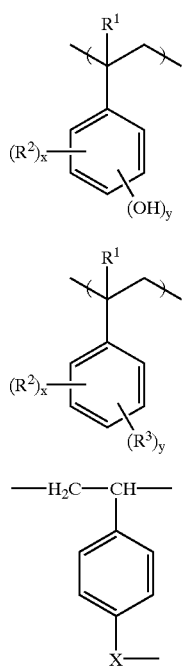

(1)

(2)

(3a)

wherein in each case independently $R^1$ is hydrogen or methyl, $R^2$ is a straight-chain, branched or cyclic alkyl group of 1 to 30 carbon atoms or an aryl group of 6 to 30 carbon atoms, $R^3$ is hydroxyl or $OR^4$, $R^4$ is an acid labile group or acid stable group, X is a valence bond or a straight-chain or branched alkylene group of 1 to 10 carbon atoms which optionally comprises a hydroxyl or carbonyl group, x is 0 or a positive integer, y is a positive integer, and the sum of x and y is up to 5.

8. A polymer of claim 7, further comprising recurring units of a compound of formula (4), (5), (6), (7) or (8)

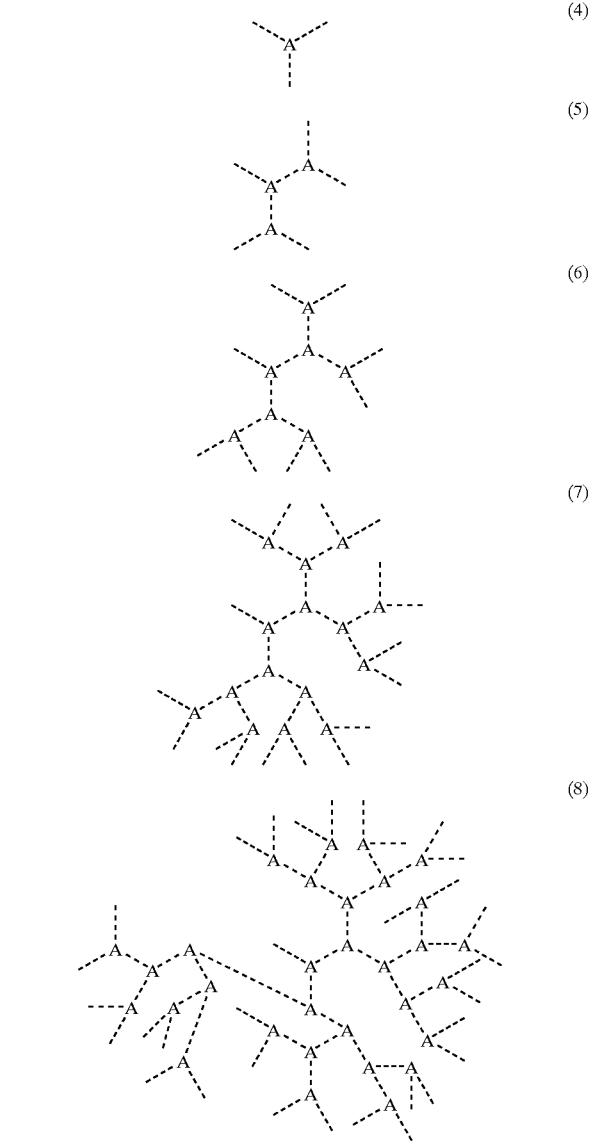

wherein broken lines represent polymer chains of the recurring units of a compound of formula (1) and/or (2), and A represents the units of a compound of formula (3).

9. A method for preparing a polymer of claim 7, comprising steps of polymerizing a hydroxystyrene derivative monomer into an intermediate and finally into a polymer, adding a branching monomer midway in the polymerization step to introduce branch chains into the intermediate, and repeating the polymerizing and branching steps until the desired polymer is obtained.

10. A method of claim 9, wherein the hydroxystyrene derivative monomer is a compound of formula (i) or (ii), and the branching monomer is a compound of formula (iii):